United States Patent
Oohashi

(10) Patent No.: US 6,911,758 B2
(45) Date of Patent: Jun. 28, 2005

(54) STATOR FOR A ROTARY ELECTRIC MACHINE

(75) Inventor: Atsushi Oohashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/804,137

(22) Filed: Mar. 19, 2004

(65) Prior Publication Data

US 2004/0232780 A1 Nov. 25, 2004

(30) Foreign Application Priority Data

May 21, 2003 (JP) ........................................ 2003-143446

(51) Int. Cl.⁷ ............................................... H02K 1/00
(52) U.S. Cl. ............................ 310/179; 310/51; 310/71
(58) Field of Search ............................. 310/51, 71, 179, 310/183–189, 214–216

(56) References Cited

U.S. PATENT DOCUMENTS

| 4,985,654 A | * | 1/1991 | Morikane | .................... 310/249 |
| 5,982,061 A | * | 11/1999 | Grantz et al. | ............. 310/67 R |
| 6,100,613 A | * | 8/2000 | Tanaka et al. | ............ 310/68 D |

FOREIGN PATENT DOCUMENTS

JP 2000-166149 B2 6/2000

* cited by examiner

Primary Examiner—Thanh Lam
(74) Attorney, Agent, or Firm—Sughrue Mion, PLLC

(57) ABSTRACT

Output wires are all led out of Address 1 in slots and vibration-absorbing bent portions are formed on all of the output wires between a leader portion led out from a rear-end coil end group and a tip portion of the output wire.

13 Claims, 8 Drawing Sheets

STATOR FOR A ROTARY ELECTRIC MACHINE

BACKGROUND OF THE INVENTION

1. Field of the Invention

The present invention relates to a stator for a rotary electric machine and particularly to an output wire construction for a stator winding.

2. Description of the Related Art

In a conventional stator for a rotary electric machine, a stator winding is constituted by electrical conductors arranged in single columns in slots in order of an inner edge layer, an inner intermediate layer, an outer intermediate layer, and an outer edge layer from a radially-inner side, output wires being led out of the outer intermediate layer or the inner intermediate layer. (See Patent Literature 1, for example.)

Patent Literature 1: Japanese Patent No. 3303809 (Gazette, Claims)

However, in a conventional stator for a rotary electric machine, because the output wires are led out of the intermediate layers, when mounted to the rotary electric machine, clearance between leader wires and brackets is extremely small. Here, the output wires are led out of the intermediate layers of a coil end group, extend in an axial direction, and are connected to connection terminals of a rectifier. As a result, one problem has been that when relative positional displacement occurs between the stator and the rectifier due to vibrations from an engine, the rotary electric machine, etc., excessive tensile forces and compressive forces act on the output wires, giving rise to fatigue failure in the output wires.

SUMMARY OF THE INVENTION

The present invention aims to solve the above problems and an object of the present invention is to provide a stator for a rotary electric machine having superior reliability by leading an output wire out of an innermost layer of a coil end group and forming a vibration-absorbing bent portion on a region of the output wire between a leader portion led out from the coil end group and a connection portion connected to a rectifier to suppress fatigue failure in the output wire by absorbing tensile forces and compressive forces acting on the output wire.

With the above object in view, according to the present invention, there is provided a stator for a rotary electric machine including a cylindrical stator core in which a plurality of slots opening onto an inner circumferential side are arranged in a circumferential direction; and a stator winding constituted by electrical conductors housed so as to line up in a single column of $2n$ electrical conductors in a slot depth direction inside each of the slots, where n is an integer greater than or equal to 2. The stator winding has a plurality of output wires that are all led out from the electrical conductors housed in either a first position or a second position from a slot opening inside the slots. Further, the stator winding has a plurality of vibration-absorbing bent portions. Each of the vibration-absorbing bent portions is formed on each of the output wires between a leader portion led out from a coil end group and a tip portion of the output wire.

Therefore, a stator for a rotary electric machine having superior reliability is provided.

DETAILED DESCRIPTION OF THE PREFERRED EMBODIMENTS

Preferred embodiments of the present invention will now be explained with reference to the drawings.

Embodiment 1

Figure 1:
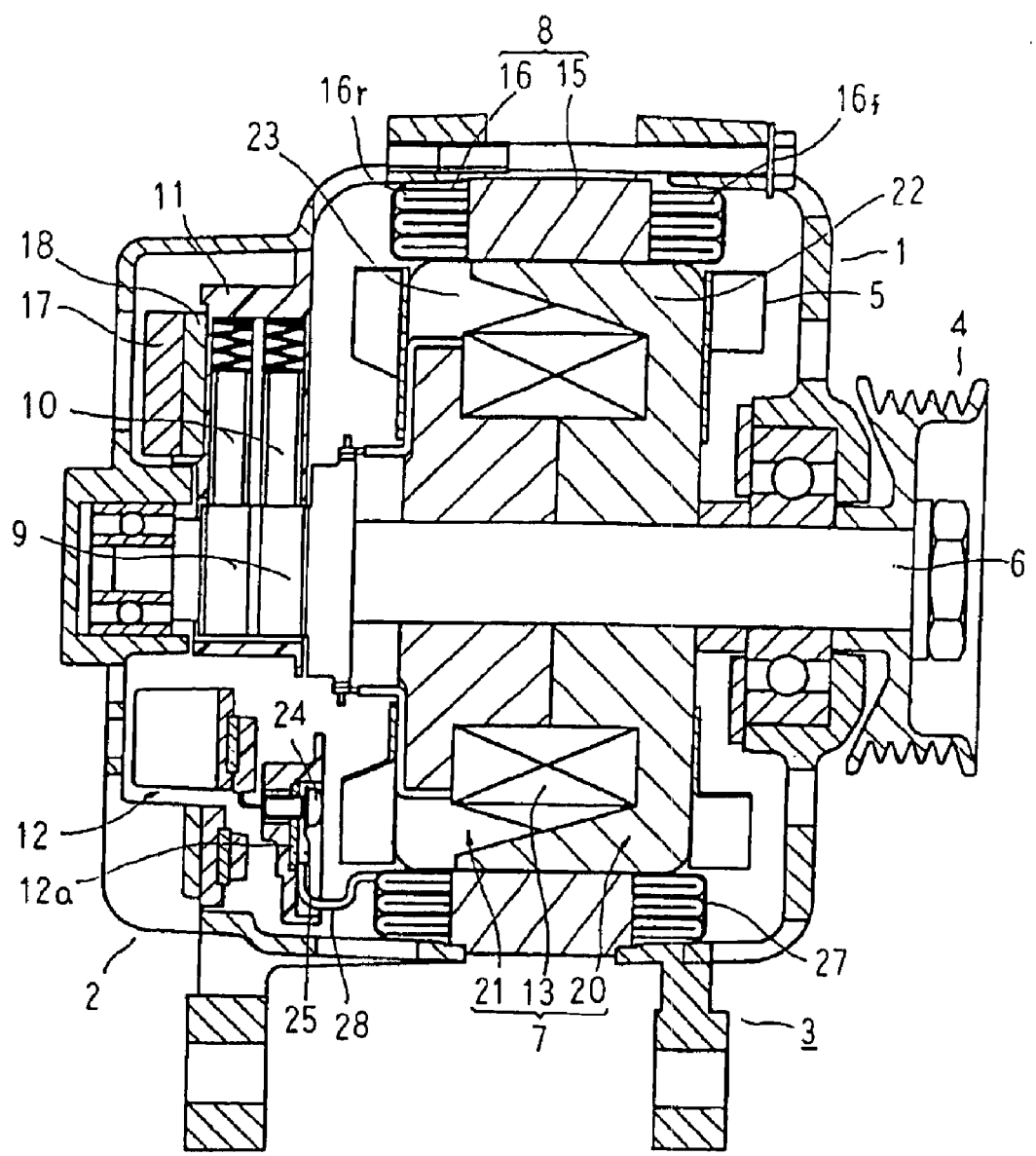
FIG. 1 is a longitudinal section showing an automotive alternator mounted with a stator for a rotary electric machine according to Embodiment 1 of the present invention.
Figure 2:
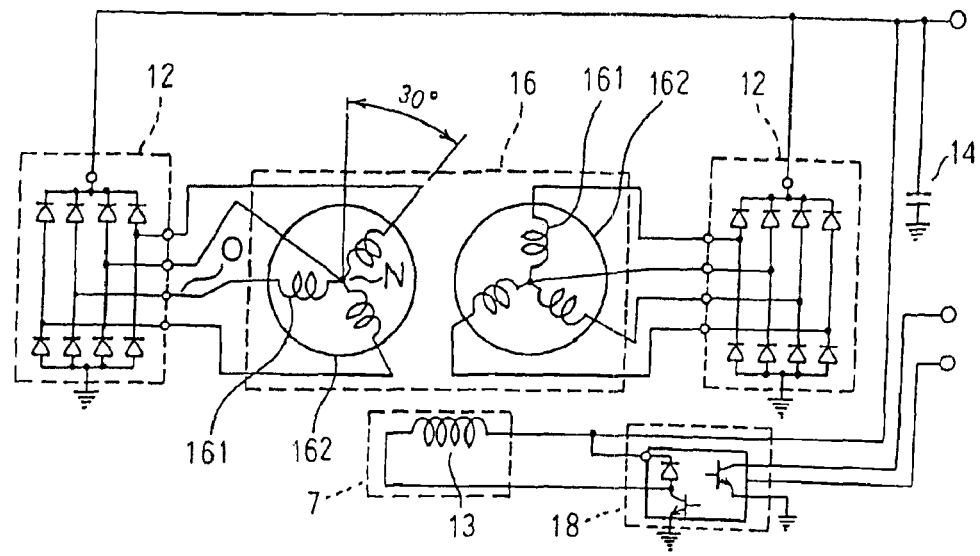
FIG. 2 is an electrical circuit diagram for the automotive alternator mounted with the stator for a rotary electric machine according to Embodiment 1 of the present invention.
Figure 3:
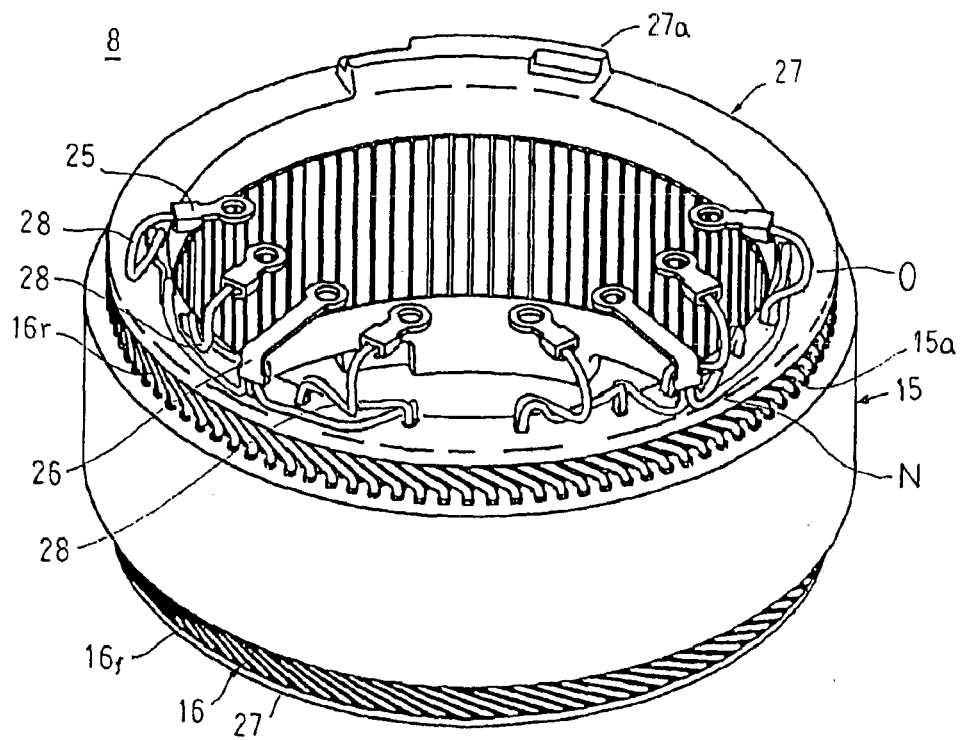
FIG. 3 is a perspective showing the stator for a rotary electric machine according to Embodiment 1 of the present invention.
Figure 4:
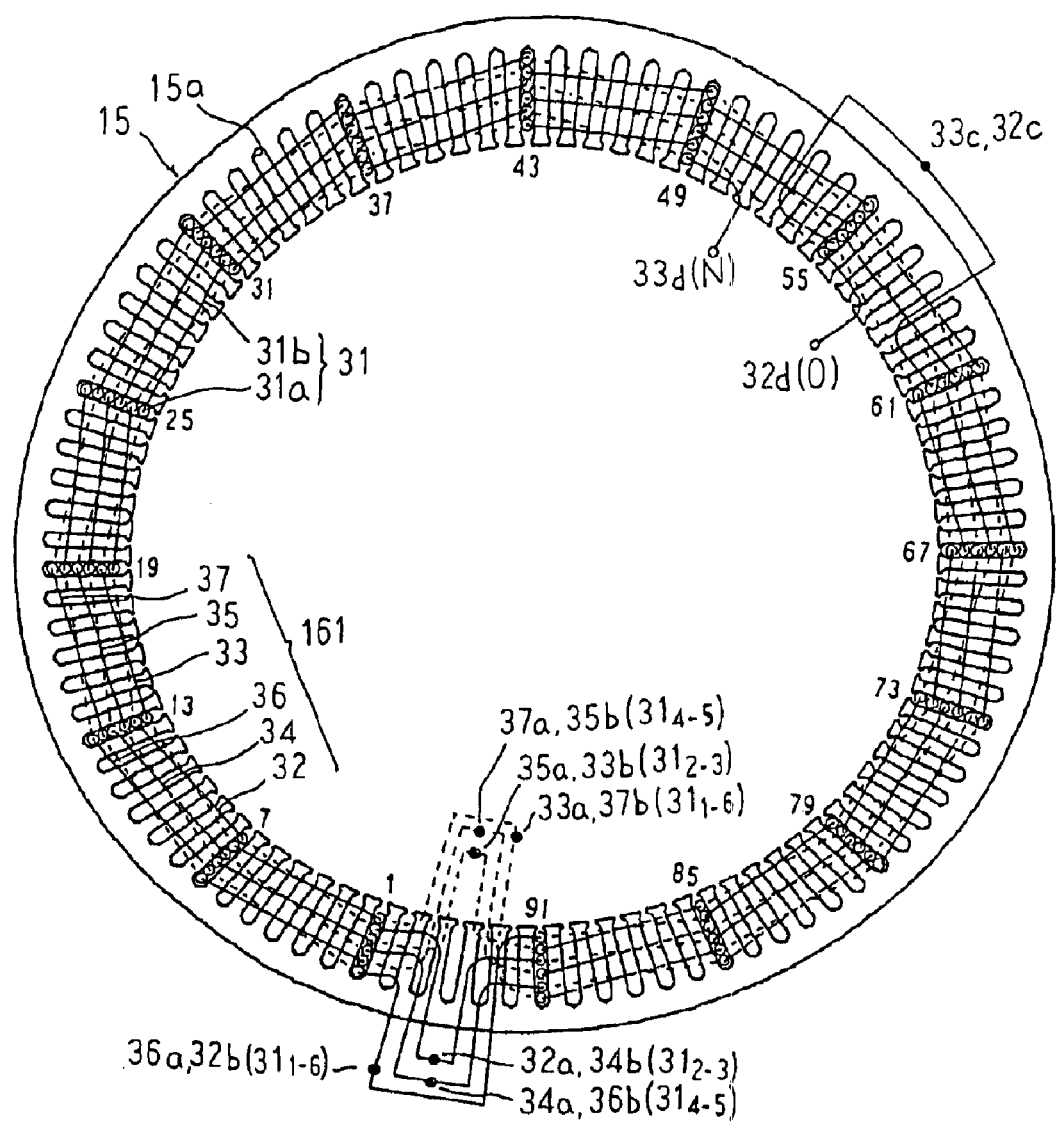
FIG. 4 is a rear-end end elevation schematically showing a first single-phase winding phase portion of a stator winding in the stator for a rotary electric machine according to Embodiment 1 of the present invention.
Figure 5:
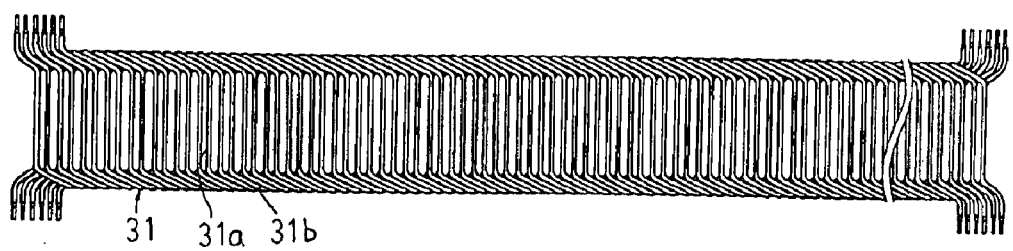
FIG. 5 is a diagram explaining a first winding assembly used in the stator winding of the stator for a rotary electric machine according to Embodiment 1 of the present invention.
Figure 6:
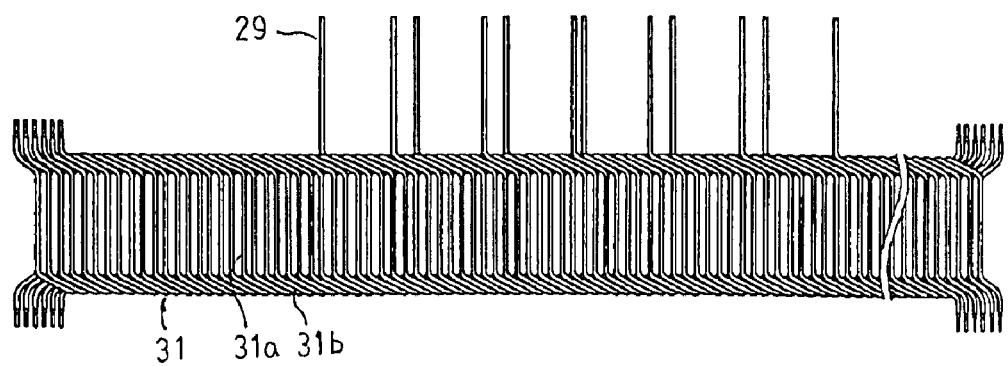
FIG. 6 is a diagram explaining a second winding assembly used in the stator winding of the stator for a rotary electric machine according to Embodiment 1 of the present invention.
Figure 7:
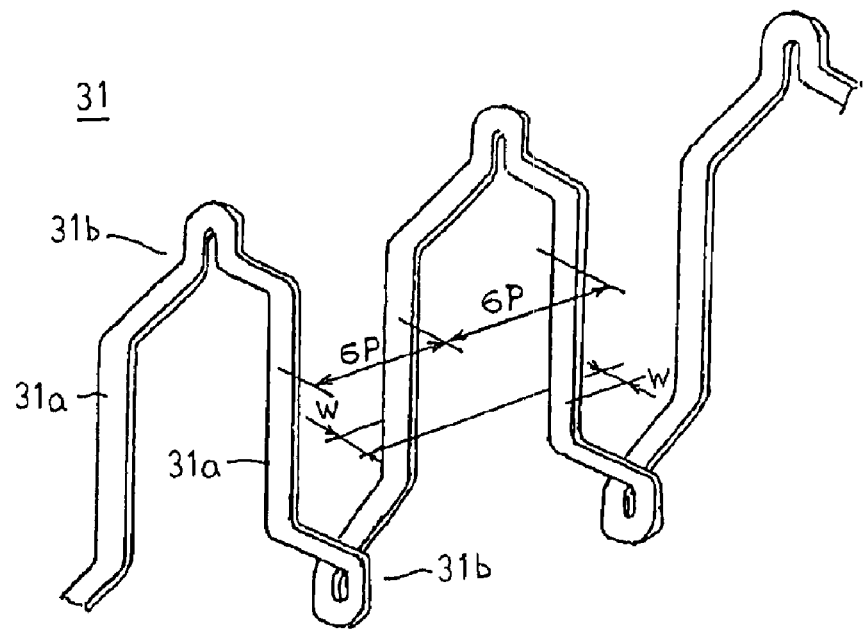
FIG. 7 is a perspective showing a continuous conductor wire constituting part of a winding assembly used in the stator winding of the stator for a rotary electric machine according to Embodiment 1 of the present invention.
Figure 8:
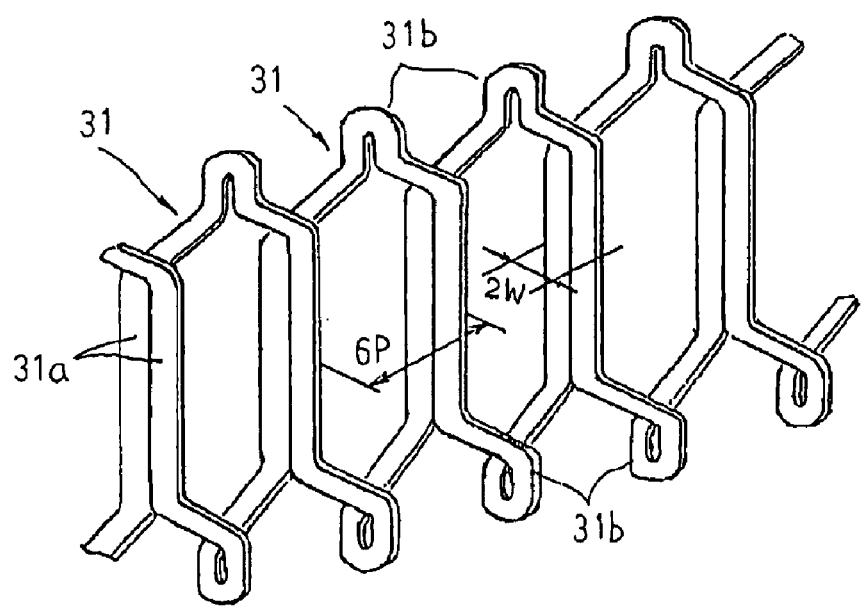
FIG. 8 is a perspective showing a pair of continuous conductor wires constituting part of a winding assembly used in the stator winding of the stator for a rotary electric machine according to Embodiment 1 of the present invention.

FIG. 1 is a longitudinal section showing an automotive alternator mounted with a stator for a rotary electric machine according to Embodiment 1 of the present invention, FIG. 2 is an electrical circuit diagram for the automotive alternator shown in FIG. 1, FIG. 3 is a perspective showing the stator for a rotary electric machine according to Embodiment 1 of the present invention, and FIG. 4 is a rear-end end elevation schematically showing a first single-phase winding phase portion of a stator winding in the stator for a rotary electric machine according to Embodiment 1 of the present invention, solid lines in the figure indicating wiring at a rear end, broken lines indicating wiring at a front end, and black circles indicating joint portions. FIGS. 5 and 6 are diagrams each explaining first and second winding assembly used in the stator winding of the stator for a rotary electric machine according to Embodiment 1 of the present invention, FIG. 7 is a perspective showing a continuous conductor wire constituting part of the winding assemblies shown in FIGS. 5 and 6, and FIG. 8 is a perspective showing a pair of continuous conductor wires constituting part of the winding assemblies shown in FIGS. 5 and 6.

In FIG. 1, an automotive alternator functioning as a rotary electric machine is provided with: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; fans 5 secured to first and second axial end portions of the rotor 7; a stator 8 secured to the case 3 so as to envelop the rotor 7; slip rings 9 secured to a second end portion of the shaft 6 for supplying an electric current to the rotor 7; a pair of brushes 10 sliding on surfaces of the slip rings 9; a brush holder 11 for housing the brushes 10; rectifiers 12 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding. The first and second pole cores 20 and 21 are made of iron, having four first and four second claw-shaped magnetic poles 22 and 23, respectively, each of the claw-shaped magnetic poles 22 and 23 having a generally trapezoidal outermost diameter surface shape and being disposed on an outer circumferential edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

The stator 8 is constituted by: a cylindrical stator core 15; and a stator winding 16 installed in the stator core 15.

Next, a configuration of the stator 8 will be explained with reference to FIGS. 3 and 4. Here, in the stator core 15, slots 15a having grooves lying in an axial direction are formed at a ratio of two slots per phase per pole. In other words, ninety-six slots 15a are arranged circumferentially on an inner circumferential side of the stator core 15, the number of magnetic poles in the rotor 7 being sixteen. The stator winding 16 is constructed by installing in the stator core 15 continuous conductor wires 31 functioning as base strands. These continuous conductor wires 31 are formed by coating an electrically-insulating coating onto a continuous copper wire having a rectangular cross section. In addition, to facilitate explanation, Slot Numbers from 1 to 96 are allocated to each of the slots 15a as shown in FIG. 4, and the positions in each of the slots 15a in which the conductor segments 31 are housed are designated Address 1, Address 2, etc., through Address 6, respectively, from an inner circumferential side.

First, a specific construction of the stator winding 16 will be explained.

A first single-phase winding phase portion 161, as shown in FIG. 4, is constituted by first to sixth winding sub-portions 32 to 37 each composed of one continuous conductor wire 31.

The first winding sub-portion 32 is constructed by wave winding one continuous conductor wire 31 into every sixth slot from Slot Numbers 1 to 91 so as to alternately occupy Address 2 and Address 1 in the slots 15a. The second winding sub-portion 33 is constructed by wave winding a continuous conductor wire 31 into every sixth slot from Slot Numbers 1 to 91 so as to alternately occupy Address 1 and Address 2 in the slots 15a. The third winding sub-portion 34 is constructed by wave winding a continuous conductor wire 31 into every sixth slot from Slot Numbers 1 to 91 so as to alternately occupy Address 4 and Address 3 in the slots 15a. The fourth winding sub-portion 35 is constructed by wave winding a continuous conductor wire 31 into every sixth slot from Slot Numbers 1 to 91 so as to alternately occupy Address 3 and Address 4 in the slots 15a. The fifth winding sub-portion 36 is constructed by wave winding a continuous conductor wire 31 into every sixth slot from Slot Numbers 1 to 91 so as to alternately occupy Address 6 and Address 5 in the slots 15a. The sixth winding sub-portion 37 is constructed by wave winding a continuous conductor wire 31 into every sixth slot from Slot Numbers 1 to 91 so as to alternately occupy Address 5 and Address 6 in the slots 15a. In each of the slots 15a, straight portions 31b of the six continuous conductor wires 31 (electrical conductors) are arranged so as to line up in one column in a radial direction (a slot depth direction) with longitudinal axes of their rectangular cross sections aligned radially.

At a front end of the stator core 15, a first end portion 35a of the fourth winding sub-portion 35 projecting outward from Address 3 of Slot Number 1 and a second end portion 33b of the second winding sub-portion 33 projecting outward from Address 2 of Slot Number 91 are joined, a first end portion 37a of the sixth winding sub-portion 37 projecting outward from Address 5 of Slot Number 1 and a second end portion 35b of the fourth winding sub-portion 35 projecting outward from Address 4 of Slot Number 91 are joined, and a first end portion 33a of the second winding sub-portion 33 projecting outward from Address 1 of Slot Number 1 and a second end portion 37b of the sixth winding sub-portion 37 projecting outward from Address 6 of Slot Number 91 are joined to form a three-turn wave winding in which the second, fourth, and sixth winding sub-portions 33, 35, and 37 are connected in series. Moreover, in FIG. 4, a front-end first joint portion $31_{2-3}$ is a joint portion between the first end portion 35a of the fourth winding sub-portion 35 and the second end portion 33b of the second winding sub-portion 33, a front-end second joint portion $31_{4-5}$ is a joint portion between the first end portion 37a of the sixth winding sub-portion 37 and the second end portion 35b of the fourth winding sub-portion 35, and a front-end third joint portion $31_{1-6}$ is a joint portion between the first end portion 33a of the second winding sub-portion 33 and the second end portion 37b of the sixth winding sub-portion 37.

At a rear end of the stator core 15, a first end portion 32a of the first winding sub-portion 32 projecting outward from Address 2 of Slot Number 1 and a second end portion 34b of the third winding sub-portion 34 projecting outward from Address 3 of Slot Number 91 are joined, a first end portion 34a of the third winding sub-portion 34 projecting outward from Address 4 of Slot Number 1 and a second end portion 36b of the fifth winding sub-portion 36 projecting outward from Address 5 of Slot Number 91 are joined, and a first end portion 36a of the fifth winding sub-portion 36 projecting outward from Address 6 of Slot Number 1 and a second end portion 32b of the first winding sub-portion 32 projecting outward from Address 1 of Slot Number 91 are joined to form a three-turn wave winding in which the first, third, and fifth winding sub-portions 32, 34, and 36 are connected in series. Moreover, in FIG. 4, a rear-end first joint portion $31_{2-3}$ is a joint portion between the first end portion 32a of the first winding sub-portion 32 and the second end portion 34b of the third winding sub-portion 34, a rear-end second joint portion $31_{4-5}$ is a joint portion between the first end portion 34a of the third winding sub-portion 34 and the second end portion 36b of the fifth winding sub-portion 36, and a rear-end third joint portion $31_{1-6}$ is a joint portion between the first end portion 36a of the fifth winding sub-portion 36 and the second end portion 32b of the first winding sub-portion 32.

A portion of the continuous wire 31 of the second winding sub-portion 33 projecting outward at the rear end of the stator core 15 from Slot Numbers 49 and 55 is cut, and a portion of the continuous wire 31 of the first winding sub-portion 32 projecting outward at the rear end of the stator core 15 from Slot Numbers 55 and 61 is cut. Then, the six-turn first single-phase winding phase portion 161 is formed such that the first to sixth winding sub-portions 32 to 37 are connected in series by joining together a first cut end 32c of the first winding sub-portion 32 and a first cut end 33c of the second winding sub-portion 33.

Moreover, a second cut end 32d of the first winding sub-portion 32 projecting outward from Address 1 of Slot Number 55 of the slots 15a becomes an output wire (O) of the first single-phase winding phase portion 161, and a second cut end of the second winding sub-portion 33 projecting outward from Address 1 of Slot Number 49 of the slots 15a becomes a neutral-point leader wire (N) of the first single-phase winding phase portion 161.

Moreover, only the first single-phase winding phase portion 161, which is installed in a first slot group including Slot Numbers 1, 7, etc., through 91, is shown in FIG. 4, but second to sixth single-phase winding phase portions 161 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

At the front end of a stator winding 16 constructed in this manner, return portions 31b of the continuous conductor wires 31 projecting outward from each of the slots 15a and entering slots 15a six slots away are arranged at a pitch of one slot so as to form three rows in a circumferential direction and constitute a front-end coil end group 16f. In other words, the front-end coil end group 16f is constructed such that annular layers of return portions 31b are arranged into a layered shape having three layers in a radial direction. In addition, the front-end first joint portions $31_{2-3}$, the front-end second joint portions $31_{4-5}$, and the front-end third joint portions $31_{1-6}$ joining together the end portions of the continuous conductor wires 31 are formed in close proximity to each other above the front-end coil end group 16f to constitute a front-end ancillary connection portion.

Similarly, at the rear end, return portions 31b of the continuous conductor wires 31 projecting outward from each of the slots 15a and entering slots 15a six slots away are arranged at a pitch of one slot so as to form three rows in a circumferential direction and constitute a rear-end coil end group 16r. In other words, the rear-end coil end group 16r is constructed such that annular layers of return portions 31b are arranged into a layered shape having three layers in a radial direction. Furthermore, the rear-end first joint portions $31_{2-3}$, the rear-end second joint portions $31_{4-5}$, and the rear-end third joint portions $31_{1-6}$ joining together the end portions of the continuous conductor wires 31 are formed in close proximity to each other above the rear-end coil end group 16r to constitute a rear-end ancillary connection portion. In addition, the output wires (O) and the neutral-point leader wires (N) of the first to sixth single-phase winding phase portions 161 are led out from a layer of the return portions 31b positioned on the radially innermost side (an innermost layer) of the rear-end coil end group 16r.

Front-end and rear-end wind shield plates 27 made of a resin having an L-shaped cross section are mounted to the front-end and rear-end coil end groups 16f and 16r, respectively, as shown in FIG. 3. The front-end and rear-end ancillary connection portions are housed inside cap portions 27a of the wind shield plates 27, the output wires (O) and the neutral-point leader wires (N) of the first to sixth single-phase winding phase portions 161 being led out through the rear-end wind shield plate 27. These wind shield plates 27 are mounted to inner circumferential surfaces and axial end surfaces of the front-end and rear-end coil end groups 16f and 16r in a generally closely-fitted state, an electrically-insulating resin such as a varnish, etc., being injected into and hardened in the front-end and rear-end coil end groups 16f and 16r from radially outside.

A first three-phase alternating-current winding 162 is prepared by connecting together each of the neutral-point leader wires (N) of the first, third, and fifth single-phase winding phase portions 161 installed in the first slot group, the third slot group, and the fifth slot group, respectively, to form the first, third, and fifth single-phase winding phase portions 161 into a Y connection (an alternating-current connection). Similarly, a second three-phase alternating-current winding 162 is prepared by connecting together each of the neutral-point leader wires (N) of the second, fourth, and sixth single-phase winding phase portions 161 installed in the second slot group, the fourth slot group, and the sixth slot group, respectively, to form the second, fourth, and sixth single-phase winding phase portions 161 into a Y connection (an alternating-current connection). Finally, the stator 8 shown in FIG. 3 is prepared by connecting a first metal connection fitting 25 to an end portion of each of the output wires (O) of the first and second three-phase alternating-current windings 162 and connecting a second metal connection fitting 26 functioning as an angle terminal to each of the neutral-point leader wires (N).

Moreover, the three neutral-point leader wires (N) of each of the three-phase alternating-current windings 162 are resistance welded together onto an end portion of the respective L-shaped second metal connection fittings 26. Vibration-absorbing bent portions 28 are formed into a general U shape between leader portions of each of the output wires (O) led out from the rear-end coil end group 16r and the first metal connection fittings 25.

In the stator 8 constructed in this manner, each of the continuous conductor wires 31 constituting the first to sixth winding sub-portions 32 to 37 is installed in a wave winding so as to project outward from any given slot 15a at an end surface of the stator core 15, fold over, and enter a slot 15a six slots away. Each of the continuous conductor wires 31 is installed in every sixth slot so as to alternately occupy an inner layer and an outer layer in a slot depth direction (a radial direction).

As shown in FIG. 1, this stator 8 is mounted to an automotive alternator so as to be held between the front bracket 1 and the rear bracket 2 such that a uniform air gap is formed between outer circumferential surfaces of the first and second claw-shaped magnetic poles 22 and 23 and an inner circumferential surface of the stator core 15. The first and second metal connection fittings 25 and 26 on the output wires (O) and the neutral-point leader wires (N) of the first and second three-phase alternating current windings 162 constituting the stator winding 16 are each secured to connection terminals 12a of separate rectifiers 12 by fastening with screws 24 such that the direct-current outputs from each of the rectifiers 12 are connected in parallel and combined, as shown in FIG. 2.

In the automotive alternator constructed in this manner, an electric current is supplied to the field winding 13 from a battery 14 by means of the brushes 10 and the slip rings 9, generating a magnetic flux. The first claw-shaped magnetic poles 22 in the first pole core 20 are magnetized into North-seeking (N) poles by this magnetic flux, and the second claw-shaped magnetic poles 23 in the second pole core 21 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 16, generating an electromotive force in the stator winding 16. This alternating-current electromotive force passes through the rectifiers 12 and is converted into a direct current, and the magnitude thereof is adjusted by the regulator 18, charging the battery 14.

Next, constructions of winding assemblies effectuating the stator winding 16 will be explained with reference to FIGS. 5 to 8.

First and second winding assemblies 30A and 30B are each formed by simultaneously folding twelve continuous conductor wires 31 (base strands) arranged parallel to each other on a plane at a pitch of one slot.

As shown in FIG. 7, each of the continuous conductor wires 31 is shaped by bending into a planar pattern in which straight portions 31a linked by return portions 31b are arranged at a pitch of six slots (6P). Adjacent pairs of the straight portions 31a are offset by the return portions 31b by a width (w) of the continuous conductor wires 31 in a direction perpendicular to the direction of disposal of the straight portions 31a. Pairs of the continuous conductor wires 31 are formed such that the continuous conductor wires 31 shaped by bending in this manner are arranged so as to be offset by a pitch of six slots with straight portions 31a superposed (as shown in FIG. 8), the first and second winding assemblies 30A and 30B being constructed such that six of these pairs are arranged so as to be offset by a pitch of one slot from each other.

In these winding assemblies 30A and 30B, as shown in FIGS. 5 and 6, ninety-six pairs of straight portions 31a are arranged at a pitch of one slot, and six end portions of the continuous conductor wires 31 extend outward on each of first and second sides at first and second ends of the winding assemblies 30A and 30B. The end portions of the continuous conductor wires 31 extending outward on the first and second sides at the first and second ends of the winding assemblies 30A and 30B correspond to the end portions 32a to 37a and 32b to 37b of the first to sixth winding sub-portions 32 to 37 in FIG. 4. In the second winding assembly 30B, projecting portions 29 are formed in twelve positions by paying out corresponding extra amounts of the continuous conductor wires 31 during the process of folding the twelve continuous conductor wires 31. These projecting portions 29 are used to form the output wires (O) and the neutral-point leader wires (N).

Although not shown, a rectangular parallelepiped laminated core is prepared by laminating a large number of strip-shaped bodies each composed of a magnetic steel sheet in which slots are formed at a predetermined pitch and integrating the strip-shaped bodies by laser welding, for example. Next, two first winding assemblies 30A are mounted to the rectangular parallelepiped laminated core so as to be superposed in a slot depth direction, and one second winding assemblies 30B is mounted to the rectangular parallelepiped laminated core so as to be superposed in an innermost layer in a slot depth direction. Here, six straight portions 31a are housed in each of the slots of the laminated core so as to line up in single columns with the longitudinal axes of the rectangular cross sections thereof aligned in the slot depth direction. Then, an annular stator core 15 is prepared by rolling up the laminated core, abutting the end portions of the laminated core, and joining them integrally by laser welding, for example.

Thereafter, each of the projecting portions 29 is cut, the electrically-insulating coating on the cut end portions thereof and the electrically-insulating coating on the end portions of the continuous conductor wires 31 is removed to expose the copper wire, the connection process shown in FIG. 4 is applied, and the wind shield plates 27 are mounted to the front-end and rear-end coil end groups 16f and 16r. Next, the stator 8 shown in FIG. 3 is prepared by connecting a first metal connection fitting 25 to an end portion of each of the output wires (O) of the first and second three-phase alternating-current windings 162 and connecting a second metal connection fitting 26 to each of the neutral-point leader wires (N).

According to Embodiment 1, the bent portions 28 are formed on regions of the output wires (O) of the three-phase alternating-current windings 162 constituting the stator winding 16 between leader portions led out from the rear-end coil end group 16r and connection portions connected to the rectifiers 12. In actual machines in which automotive alternators mounted with the stator 8 were installed, even if vibrations from the engine and the automotive alternator acted to displace the relative positions between the stator 8 and the rectifier 12, the positional changes were absorbed by expansion and contraction of the bent portions 28. Thus, since neither excessive tensile forces nor excessive compressive forces act on the output wires (O), the occurrence of fatigue failure in the output wires (O) is suppressed. Furthermore, formation of the bent portions 28 is made possible because the output wires (O) are led out of Address 1 in the slots 15a, increasing the clearance between the output wires (O) and the rear bracket 2.

Because the output wires (O) and the neutral-point leader wires (N) of the three-phase alternating-current windings 162 constituting the stator winding 16 are led out from the innermost layer of the rear-end coil end group 16r, the projecting portions 29 for preparing the output wires (O) and the neutral-point leader wires (N) need only be formed on the winding assembly disposed in the innermost layer, i.e., the second winding assembly 30B. First winding assemblies 30A that are identical to each other can be used for the winding assemblies disposed in the intermediate layer and the outermost layer. Thus, there are two types of winding assembly mounted to the stator core 15, namely, the first and second winding assemblies 30A and 30B, facilitating manufacturing of the winding assemblies. Furthermore, using more first winding assemblies 30A, which have no projecting portions 29 and are therefore easier to manufacture, leads to reduced manufacturing costs for the stator 8. This effect increases as the number of winding assemblies mounted to the stator core 15 increases. In addition, manufacturing of the stator winding 16 is facilitated because the operations of cutting the projecting portions 29 and connecting the cut ends of the projecting portions 29, etc., when preparing the output wires (O) and the neutral-point leader wires (N) are limited to the innermost layer of the rear-end coil end group 16r.

Because the stator winding 16 is constructed using winding assemblies 30A and 30B made of continuous conductor wires 31, the number of joints required to prepare the stator winding 16 is significantly reduced, facilitating manufacturing of the stator 8.

Because wind shield plates 27 are mounted to the front-end and rear-end coil end groups 16f and 16r, the return portions 31b located at the radially-innermost position are prevented from flopping radially inward, reliably preventing contact between the front-end and rear-end coil end groups 16f and 16r and the rotor 7. Furthermore, because surfaces of the front-end and rear-end coil end groups 16f and 16r facing the rotor are constituted by the flat inner circumferential surfaces of the wind shield plates 27, wind noise is reduced.

Because three neutral-point leader wires (N) are resistance welded together onto an end portion of each of the metal connection fittings 26 for connection to the connection terminals 12a of the rectifiers 12, the operation of connecting the neutral-point leader wires (N) to the rectifier 12 is facilitated.

Moreover, in Embodiment 1 above, the output wires (O) and the neutral-point leader wires (N) are explained as being led out from Address 1 of the slots 15a, but the first cut end 32c of the first winding sub-portion 32 and the second cut end 33d of the second winding sub-portion 33 in FIG. 4 may also be joined together, the output wire (O) (the second cut end 32d of the first winding sub-portion 32) being led out from Address 1 of the slots 15a and the neutral-point leader wire (N) (the first cut end 33c of the second winding sub-portion 33) being led out from Address 2 of the slots 15a. Alternatively, the second cut end 32d of the first winding sub-portion 32 and the first cut end 33c of the second winding sub-portion 33 in FIG. 4 may also be joined together, the output wire (O) (the second cut end 33d of the second winding sub-portion 33) being led out from Address 1 of the slots 15a and the neutral-point leader wire (N) (the first cut end 32c of the first winding sub-portion 32) being led out from Address 2 of the slots 15a.

Embodiment 2

Figure 9:
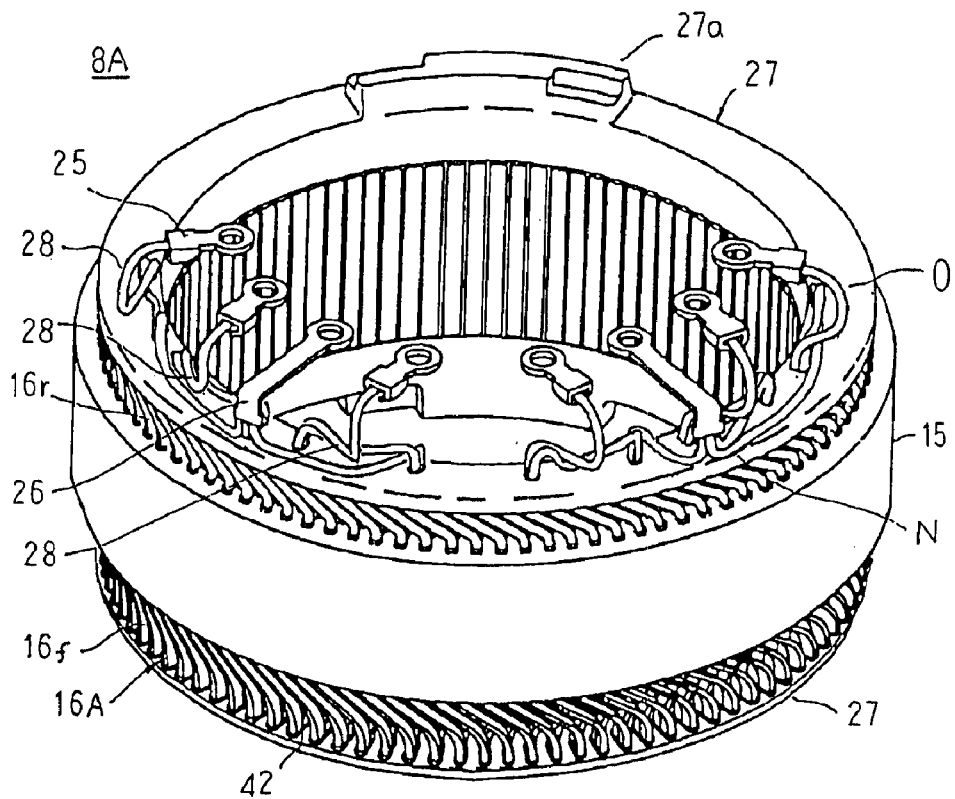
FIG. 9 is a perspective showing a stator for a rotary electric machine according to Embodiment 2 of the present invention.
Figure 10:
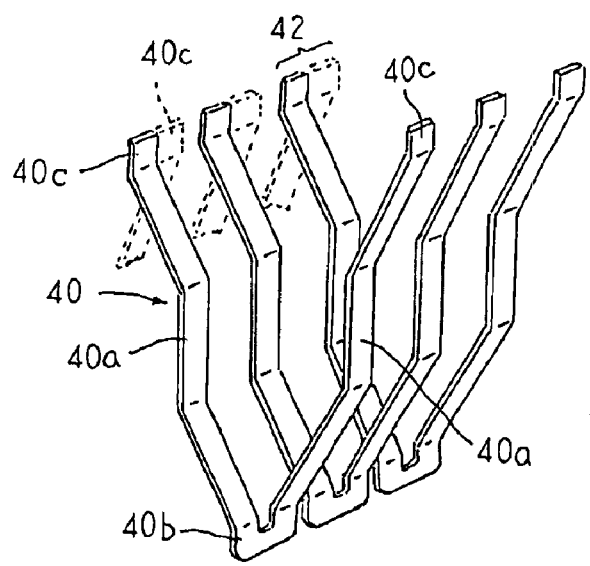
FIG. 10 is a perspective explaining an arrangement of conductor segments used in a stator winding of the stator for a rotary electric machine according to Embodiment 2 of the present invention.
Figure 11:
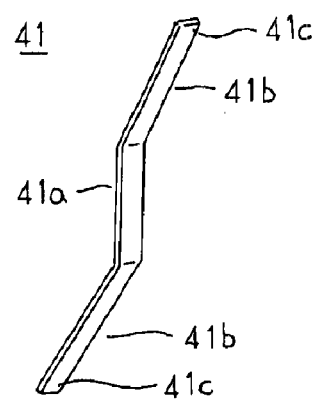
FIG. 11 is a perspective showing a modified conductor segment used in the stator winding of the stator for a rotary electric machine according to Embodiment 2 of the present invention.

FIG. 9 is a perspective showing a stator for a rotary electric machine according to Embodiment 2 of the present invention, FIG. 10 is a perspective explaining an arrangement of conductor segments used in a stator winding of the stator for a rotary electric machine according to Embodiment 2 of the present invention, and FIG. 11 is a perspective showing a modified conductor segment used in the stator winding of the stator for a rotary electric machine according to Embodiment 2 of the present invention.

In FIG. 9, a stator winding 16A of a stator 8A is constructed using conductor segments 40 and modified conductor segments 41.

Here, the conductor segments 40, as shown in FIG. 10, are constructed by shaping a copper material having a rectangular cross section coated with an electrical insulator into a general U shape in which a pair of straight portions 40a (electrical conductors) are linked by a V-shaped return portion 40b. The modified conductor segments 41, as shown in FIG. 11, are constructed by shaping a copper material having a rectangular cross section coated with an electrical insulator into a shape in which a pair of inclined portions 41b are linked by a straight portion 41a.

Next, a construction of a first single-phase winding phase portion of the stator winding 16A will be explained.

First, in a first slot group including Slot Numbers 1, 7, etc., through 91, sets of three (first, second, and third) conductor segments 40 are inserted from a rear end of a stator core 15 into pairs of (first and second) slots 15a six slots apart. More specifically, in each of the slot pairs, the first conductor segment 40 is inserted into Address 1 of the first slot 15a and Address 2 of the second slot 15a, the second conductor segment 40 is inserted into Address 3 of the first slot 15a and Address 4 of the second slot 15a, and the third conductor segment 40 is inserted into Address 5 of the first slot 15a and Address 6 of the second slot 15a. Here, the modified conductor segments 41 are inserted into Address 2, Address 4, and Address 6 of Slot Number 1 of the slots 15a, Address 1 of Slot Number 49 of the slots 15a, Address 1 and Address 2 of Slot Number 5 of the slots 15a, Address 2 of Slot Number 61 of the slots 15a, and Address 1, Address 3, and Address 5 of Slot Number 91 of the slots 15a, respectively.

Open end portion regions of each of the conductor segments 40 inserted into Address 1 of the first slot 15a and Address 2 of the second slot 15a of each of the pairs of slots projecting outward at a front end of the stator core 15 are bent away from each other in a circumferential direction. Then, open end portions 40c projecting outward at the front end of the stator core 15 from Address 1 of the slots 15a and open end portions 40c projecting outward at the front end of the stator core 15 from Address 2 of slots 15a six slots away are joined.

Open end portion regions of each of the conductor segments 40 inserted into Address 3 of the first slot 15a and Address 4 of the second slot 15a of each of the pairs of slots projecting outward at a front end of the stator core 15 are bent away from each other in a circumferential direction. Then, open end portions 40c projecting outward at the front end of the stator core 15 from Address 3 of the slots 15a and open end portions 40c projecting outward at the front end of the stator core 15 from Address 4 of slots 15a six slots away are joined.

In addition, open end portion regions of each of the conductor segments 40 inserted into Address 5 of the first slot 15a and Address 6 of the second slot 15a of each of the pairs of slots projecting outward at a front end of the stator core 15 are bent away from each other in a circumferential direction. Then, open end portions 40c projecting outward at the front end of the stator core 15 from Address 5 of the slots 15a and open end portions 40c projecting outward at the front end of the stator core 15 from Address 6 of slots 15a six slots away are joined.

At the front end of the stator core 15, an end portion 40c of the conductor segment 40 projecting outward from Address 3 of Slot Number 1 and an end portion 40c of the conductor segment 40 projecting outward from Address 2 of Slot Number 91 are joined, an end portion 40c of the conductor segment 40 projecting outward from Address 5 of Slot Number 1 and an end portion 40c of the conductor segment 40 projecting outward from Address 4 of Slot Number 91 are joined, and an end portion 40c of the conductor segment 40 projecting outward from Address 1 of Slot Number 1 and an end portion 40c of the conductor segment 40 projecting outward from Address 6 of Slot Number 91 are joined. End portions 41c of the modified conductor segments 41 projecting outward at the front end from Address 2, Address 4, and Address 6 of Slot Number 1 are joined to end portions 40*c* of the conductor segments 40 projecting outward at the front end from Address 1, Address 3, and Address 5, respectively, of Slot Number 7. In addition, end portions 41*c* of the modified conductor segments 41 projecting outward at the front end from Address 1, Address 3, and Address 5 of Slot Number 91 are joined to end portions 40*c* of the conductor segments 40 projecting outward at the front end from Address 2, Address 4, and Address 6, respectively, of Slot Number 85.

At the rear end of the stator core 15, an end portion 41*c* of the modified conductor segment 41 projecting outward from Address 2 of Slot Number 1 and an end portion 41*c* of the modified conductor segment 41 projecting outward from Address 3 of Slot Number 91 are joined, an end portion 41*c* of the modified conductor segment 41 projecting outward from Address 4 of Slot Number 1 and an end portion 41*c* of the modified conductor segment 41 projecting outward from Address 5 of Slot Number 91 are joined, and an end portion 41*c* of the modified conductor segment 41 projecting outward from Address 6 of Slot Number 1 and an end portion 41*c* of the modified conductor segment 41 projecting outward from Address 1 of Slot Number 91 are joined.

An end portion 41*c* of the modified conductor segment 41 projecting outward at the front end of the stator core 15 from Address 1 of Slot Number 49 and an end portion 40*c* of the conductor segment 40 projecting outward at the front end of the stator core 15 from Address 2 of Slot Number 43 are joined. An end portion 41*c* of the modified conductor segment 41 projecting outward at the front end of the stator core 15 from Address 1 of Slot Number 55 and an end portion 40*c* of the conductor segment 40 projecting outward at the front end of the stator core 15 from Address 2 of Slot Number 49 are joined. An end portion 40*c* of the conductor segment 40 projecting outward at the front end of the stator core 15 from Address 1 of Slot Number 61 and an end portion 41*c* of the modified conductor segment 41 projecting outward at the front end of the stator core 15 from Address 2 of Slot Number 55 are joined. In addition, an end portion 40*c* of the conductor segment 40 projecting outward at the front end of the stator core 15 from Address 1 of Slot Number 67 and an end portion 41*c* of the modified conductor segment 41 projecting outward at the front end of the stator core 15 from Address 2 of Slot Number 61 are joined.

End portions 41*c* of the modified conductor segments 41 projecting outward at the rear end of the stator core 15 from Address 2 of Slot Number 55 and Address 2 of Slot Number 61 are joined to each other.

Thus, a first single-phase winding phase portion is obtained having a similar construction to the six-turn first single-phase winding phase portion 161 shown in FIG. 4 in which the first to sixth winding sub-portions 32 to 37 are connected in series.

Similarly, second to sixth single-phase winding phase portions each having a similar construction to the second to sixth single-phase winding phase portions 161 in Embodiment 1 above are installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

At the front end of the stator core 15, the joint portions 42 among the end portions 40*c* and 41*c* of the conductor segments 40 and the modified conductor segments 41 are arranged at a pitch of one slot so as to form three rows in a circumferential direction and constitute a front-end coil end group 16*f*, and at the rear end, return portions 40*b* of the conductor segments 40 are arranged at a pitch of one slot so as to form three rows in a circumferential direction and constitute a rear-end coil end group 16*r*. In other words, the front-end coil end group 16*f* is constructed such that annular layers of joint portions 42 are arranged into a layered shape having three layers in a radial direction, and the rear-end coil end group 16*r* is constructed such that annular layers of return portions 40*b* are arranged into a layered shape having three layers in a radial direction. Front-end and rear-end wind shield plates 27 are mounted to the front-end and rear-end coil end groups 16*f* and 16*r*, respectively. The output wires (O) and the neutral-point leader wires (N) of the first to sixth single-phase winding phase portions are led out through the rear-end wind shield plate 27.

A first three-phase alternating-current winding is prepared by connecting together each of the neutral-point leader wires (N) of the first, third, and fifth single-phase winding phase portions installed in the first slot group, the third slot group, and the fifth slot group, respectively, to form the first, third, and fifth single-phase winding phase portions into a Y connection (an alternating-current connection). Similarly, a second three-phase alternating-current winding is prepared by connecting together each of the neutral-point leader wires (N) of the second, fourth, and sixth single-phase winding phase portions installed in the second slot group, the fourth slot group, and the sixth slot group, respectively, to form the second, fourth, and sixth single-phase winding phase portions into a Y connection (an alternating-current connection). Finally, the stator 8A shown in FIG. 9 is prepared by connecting a first metal connection fitting 25 to an end portion of each of the output wires (O) of the first and second three-phase alternating-current windings and connecting a second metal connection fitting 26 to each of the neutral-point leader wires (N).

Moreover, vibration-absorbing bent portions 28 are formed into a general U shape between leader portions of each of the output wires (O) led out from the rear-end coil end group 16*r* and the first metal connection fittings 25.

The stator 8A constructed in this manner is constructed in a similar manner to the stator 8 in Embodiment 1 above except for the fact that the conductor segments 40 and modified conductor segments 41 are used instead of the continuous conductor wires 31.

In Embodiment 2, because the output wires (O) are led out of Address 1 of the slots 15*a* and the bent portions 28 are formed on regions of the output wires (O) of the three-phase alternating-current windings constituting the stator winding 16A between leader portions led out from the rear-end coil end group 16*r* and connection portions connected to the rectifiers 12, even if the relative positions between the stator 8 and the rectifier 12 are displaced as a result of vibrations from the engine or the automotive alternator, the positional changes are also absorbed by expansion and contraction of the bent portions 28, suppressing the occurrence of fatigue failure in the output wires (O).

Because the output wires (O) and the neutral-point leader wires (N) of the three-phase alternating-current windings constituting the stator winding 16A are led out from the innermost layer of the rear-end coil end group 16*r*, the modified conductor segments 41 for preparing the output wires (O) and the neutral-point leader wires (N) need only be disposed in the innermost layer, facilitating manufacturing of the stator winding 16A.

Because wind shield plates 27 are mounted to the front-end and rear-end coil end groups 16*f* and 16*r*, wind noise is reduced.

Because three neutral-point leader wires (N) are resistance welded together onto an end portion of each of the metal connection fittings 26 for connection to the connection terminals 12a of the rectifiers 12, the operation of connecting the neutral-point leader wires (N) to the rectifier 12 is facilitated.

Embodiment 3

Figure 12:
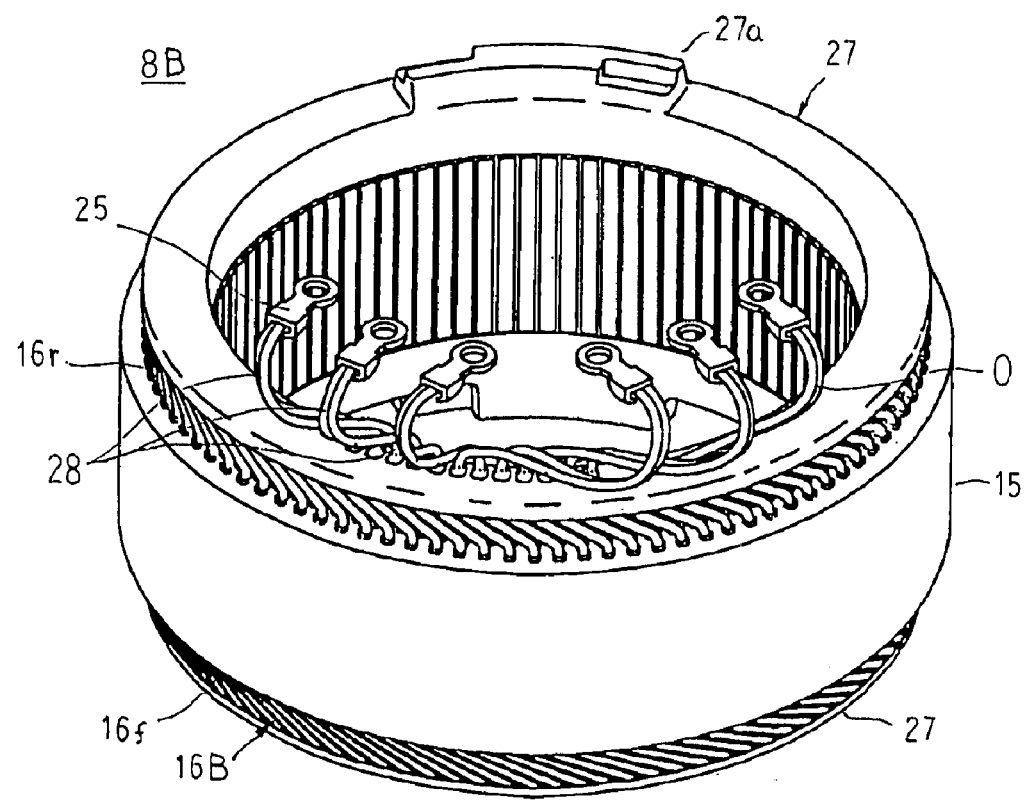
FIG. 12 is a perspective showing a stator for a rotary electric machine according to Embodiment 3 of the present invention.
Figure 13:
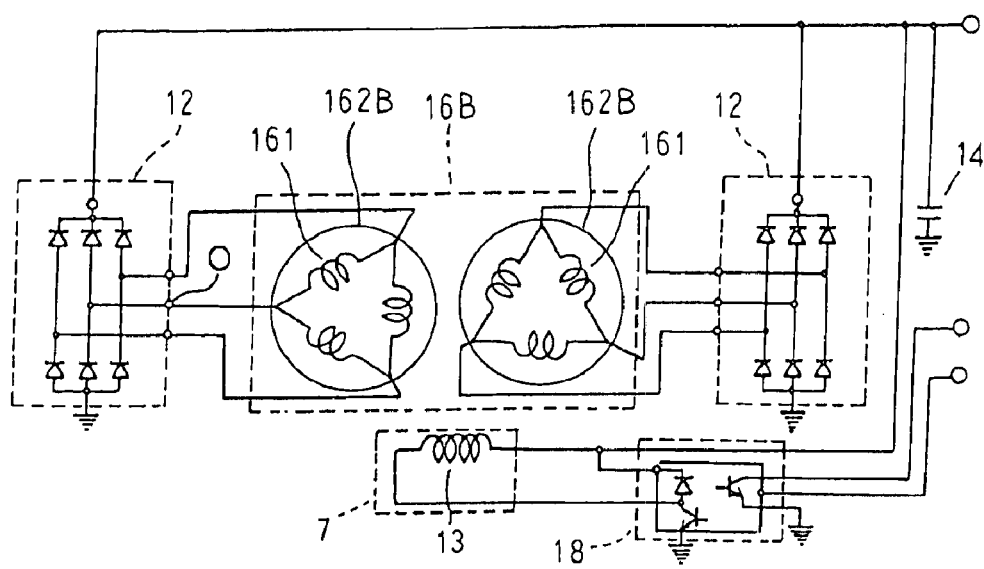
FIG. 13 is an electrical circuit diagram for an automotive alternator mounted with the stator for a rotary electric machine according to Embodiment 3 of the present invention.
Figure 14:
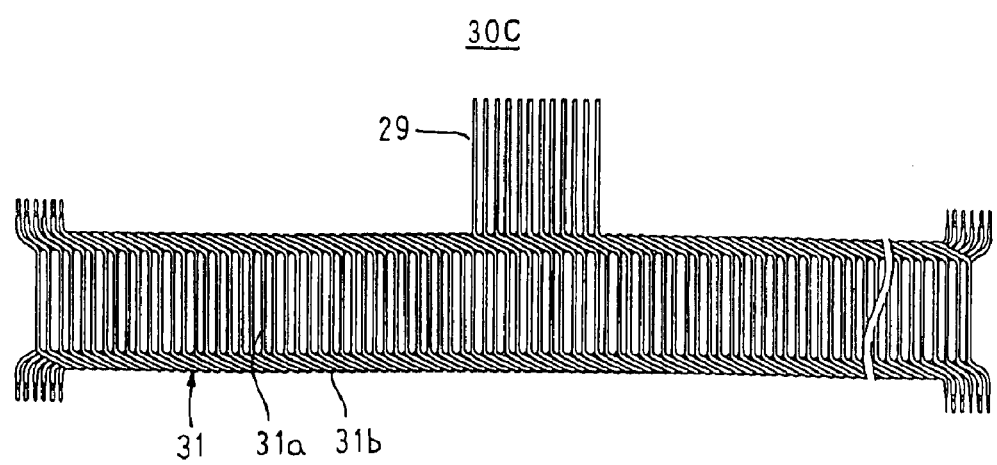
FIG. 14 is a diagram explaining a third winding assembly used in a stator winding of the stator for a rotary electric machine according to Embodiment 3 of the present invention.

FIG. 12 is a perspective showing a stator for a rotary electric machine according to Embodiment 3 of the present invention, FIG. 13 is an electrical circuit diagram for an automotive alternator mounted with the stator for a rotary electric machine according to Embodiment 3 of the present invention, and FIG. 14 is a diagram explaining a third winding assembly used in a stator winding of the stator for a rotary electric machine according to Embodiment 3 of the present invention.

In FIG. 12, a stator winding 16B is constituted by: a first three-phase alternating-current winding 162B in which three single-phase winding phase portions 161 installed in the first slot group, the third slot group, and the fifth slot group are formed into a delta connection (an alternating-current connection); and a second three-phase alternating-current winding 162B in which three single-phase winding phase portions 161 installed in the second slot group, the fourth slot group, and the sixth slot group are formed into a delta connection. Front-end and rear-end wind shield plates 27 are mounted to the front-end and rear-end coil end groups 16f and 16r, respectively. The output wires (O) of the three-phase alternating-current windings 162B are each led out from Address 1 of the slots 15a, and are further led out through the rear-end wind shield plate 27. A stator 8B is prepared by connecting a first metal connection fitting 25 to an end portion of each of the output wires (O).

Moreover, the second cut ends 32d and 33d of the first and second winding sub-portions 32 and 33 led out from Address 1 of the slots 15a in FIG. 4 are used as output wires (O) of the single-phase winding phase portions. The output wires (O) are concentrated within a predetermined circumferential range, that is, the output wires (O) are led out from Address 1 of twelve consecutive slots 15a.

As shown in FIG. 13, the first metal connection fittings 25 on the output wires (O) of the first and second three-phase alternating current windings 162B constituting the stator winding 16B are each connected to connection terminals of separate rectifiers 12 such that the direct-current outputs from each of the rectifiers 12 are connected in parallel and combined. Here, U-shaped bent portions 28 are formed on a region of each of the output wires (O) between a leader portion led out from the innermost layer of the rear-end coil end group 16r and the first metal connection fittings 25 (connection portions connected to the rectifiers 12).

In this stator 8B, a third winding assembly 30C is used instead of a second winding assembly 30B. In this third winding assembly 30C, as shown in FIG. 14, ninety-six pairs of straight portions 31a are arranged at a pitch of one slot, and six end portions of the continuous conductor wires 31 extend outward on each of first and second sides at first and second ends of the third winding assembly 30C. In the third winding assembly 30C, twelve projecting portions 29 are formed at a pitch of one slot from each other by paying out corresponding extra amounts of the continuous conductor wires 31 during the process of folding the twelve continuous conductor wires 31.

Thus, in Embodiment 3, because the output wires (O) are led out of Address 1 in the slots 15a and the bent portions 28 are formed on regions of the output wires (O) between leader portions led out from the rear-end coil end group 16r and connection portions connected to the rectifiers 12, similar effects to those in Embodiment 1 above can also be achieved.

In Embodiment 3, because each of the three-phase alternating-current windings 162B is constructed by forming three single-phase winding phase portions 161 into a delta connection, neutral-point leader wires (N) are no longer necessary, facilitating connection.

Because the output wires (O) are led out from Address 1 of twelve consecutive slots 15a, the output wires (O) are concentrated, also facilitating connection.

Moreover, in each of the above embodiments, the stators have been explained as they apply to automotive alternators, but the present invention is not limited to stators for automotive alternators and similar effects can also be achieved if the present invention is applied to stators for rotary electric machines such as automotive electric motors, automotive electric motor-generators, etc.

In each of the above embodiments, six electrical conductors are explained as being arranged into single columns inside the slots 15a, but the number of electrical conductors arranged inside the slots 15a is not limited to six and need merely be $2n$, where n is an integer greater than or equal to 2.

In each of the above embodiments, a stator core in which slots 15a are formed at a ratio of two slots per phase per pole is explained as being used, but a stator core in which slots 15a are formed at a ratio of one slot per phase per pole may also be used.

In each of the above embodiments, the bent portions 28 are explained as being formed into a general U shape, but the shape of the bent portions is not limited to a U shape provided that it is a shape that can absorb vibrations and an S shape, for example, is also acceptable.

In each of the above embodiments, the stator winding is explained as being constituted by wave windings, but the stator winding is not limited to wave windings and may also be constituted by lap windings, for example.

In each of the above embodiments, the output wires (O) are explained as being led out of Address 1 of the slots 15a, but it is only necessary for the output wires (O) to be led out from either Address 1 or Address 2 of the slots 15a.

What is claimed is:

1. A stator for a rotary electric machine comprising:
   a cylindrical stator core in which a plurality of slots opening onto an inner circumferential side are arranged in a circumferential direction; and
   a stator winding constituted by electrical conductors housed so as to line up in a single column of $2n$ electrical conductors in a slot depth direction inside each of said slots, where n is an integer greater than or equal to 2,
   wherein said stator winding has a plurality of output wires that are all led out from the electrical conductors housed in either a first position or a second position from a slot opening inside said slots, and has a plurality of vibration-absorbing bent portions, each of said vibration-absorbing bent portions being formed on each of said output wires between a leader portion led out from a coil end group and a tip portion of said output wire.

2. The stator for a rotary electric machine according to claim 1, wherein said stator winding is provided with n winding assemblies mounted to said stator core so as to be superposed in a radial direction,
   said winding assemblies each being constructed by arranging continuous conductor wire pairs equal in number to a predetermined number of slots so as to be offset by a pitch of one slot from each other, said continuous conductor wires being formed into a pattern in which said electrical conductors are linked by return portions and arranged at a predetermined slot pitch and in which adjacent pairs of said electrical conductors are offset so as to alternately occupy an inner layer and an outer layer in a slot depth direction by said return portions, said continuous conductor wire pairs each being formed such that two of said continuous conductor wires are arranged so as to be offset by said predetermined slot pitch from each other with said electrical conductors superposed, end portions of said continuous conductor wires projecting outward on first and second sides at first and second ends of said winding assembly.

3. The stator for a rotary electric machine according to claim 2, wherein said stator winding is constructed by forming three winding phase portions into a delta connection.

4. The stator for a rotary electric machine according to claim 3, wherein each of said output wires are led out from respective electrical conductor housed in each of a series of slots positioned within a predetermined circumferential range.

5. The stator for a rotary electric machine according to claim 2, wherein said stator winding is constructed by forming three winding phase portions into a Y connection, neutral-point leader wires of said three winding phase portions being joined to a single angle terminal.

6. The stator for a rotary electric machine according to claim 5, wherein neutral-point leader wires of said stator winding are all led out from electrical conductors housed in either a first position or a second position from a slot opening inside said slots.

7. The stator for a rotary electric machine according to claim 6, wherein each of said output wires and said neutral-point leader wires are led out from respective electrical conductor housed in each of a series of slots positioned within a predetermined circumferential range.

8. The stator for a rotary electric machine according to claim 1, wherein said stator winding is constituted by U-shaped conductor segments in which said electrical conductors are linked at a first end of said stator core, said linked electrical conductors being separated by a predetermined number of slots and housed in different positions in a slot depth direction inside said slots.

9. The stator for a rotary electric machine according to claim 8, wherein said stator winding is constructed by forming three winding phase portions into a delta connection.

10. The stator for a rotary electric machine according to claim 9, wherein each of said output wires are led out from respective electrical conductor housed in each of a series of slots positioned within a predetermined circumferential range.

11. The stator for a rotary electric machine according to claim 8, wherein said stator winding is constructed by forming three winding phase portions into a Y connection, neutral-point leader wires of said three winding phase portions being joined to a single angle terminal.

12. The stator for a rotary electric machine according to claim 11, wherein neutral-point leader wires of said stator winding are all led out from electrical conductors housed in either a first position or a second position from a slot opening inside said slots.

13. The stator for a rotary electric machine according to claim 12, wherein each of said output wires and said neutral-point leader wires are led out from respective electrical conductor housed in each of a series of slots positioned within a predetermined circumferential range.

* * * * *